April 24, 1928.
E. TIMBS
1,667,175
CLUTCH FOR THREE-SPEED DRAW WORKS
Original Filed April 21, 1924    2 Sheets-Sheet 1
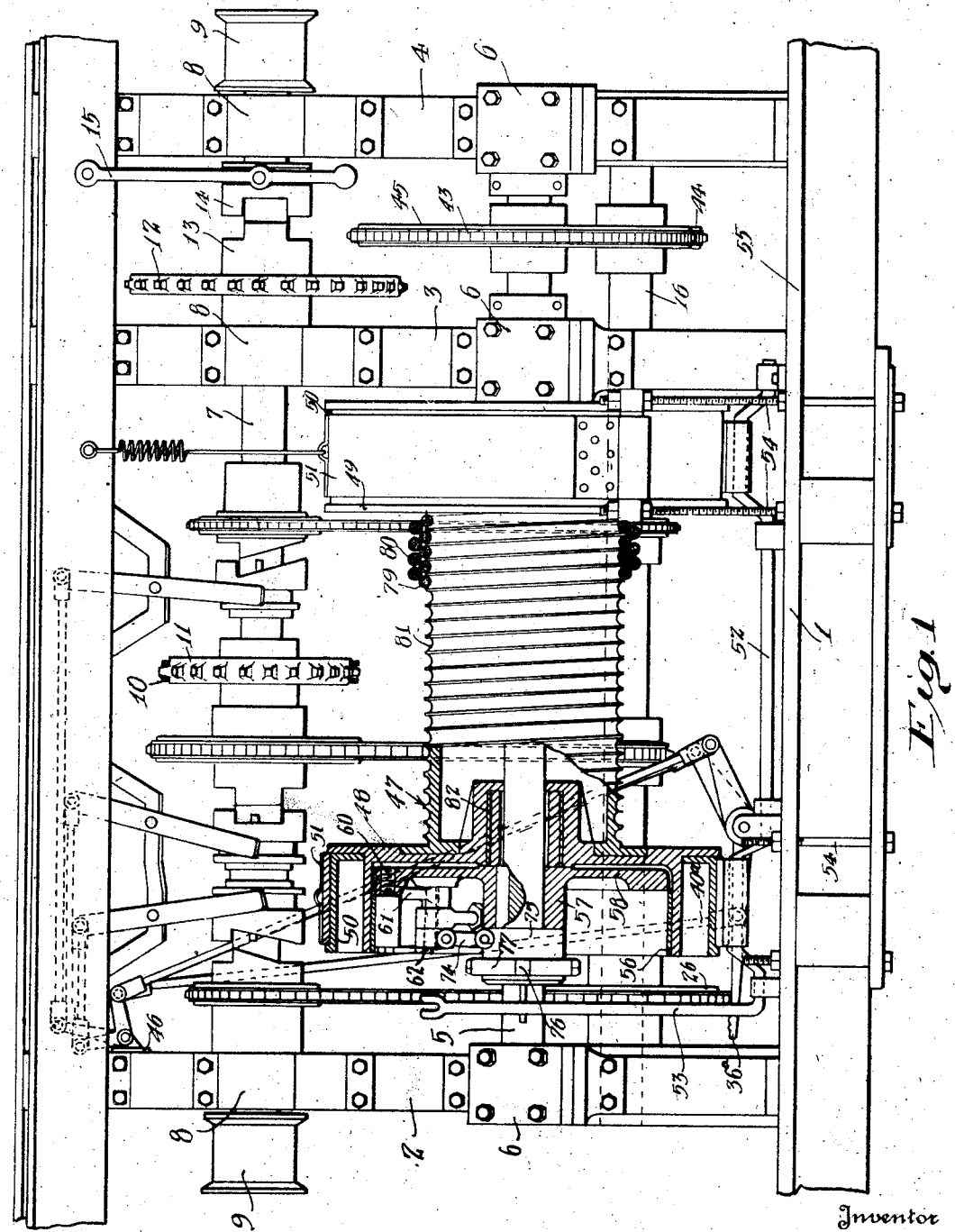
Inventor
Edward Timbs
By Lyon & Lyon
Attorneys April 24, 1928.
E. TIMBS
1,667,175
CLUTCH FOR THREE-SPEED DRAW WORKS
Original Filed April 21, 1924  2 Sheets-Sheet 2
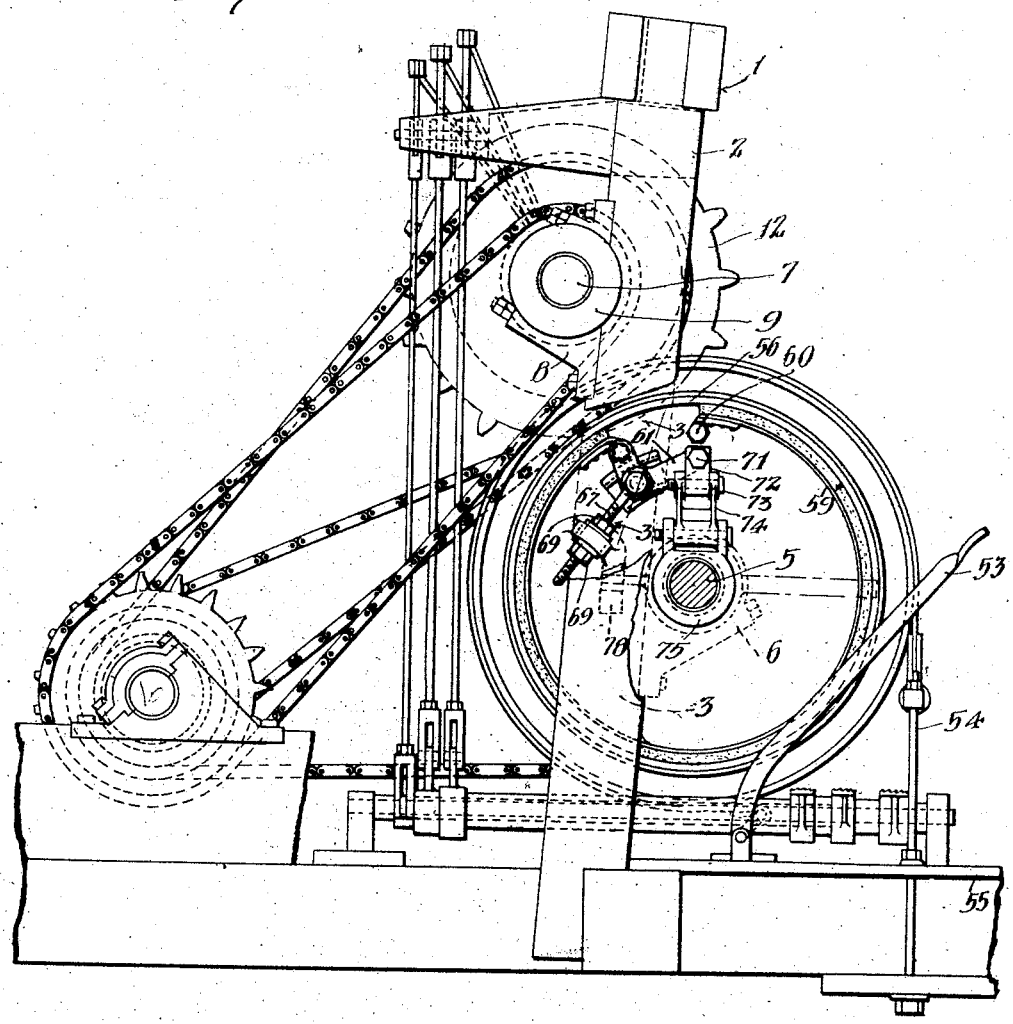
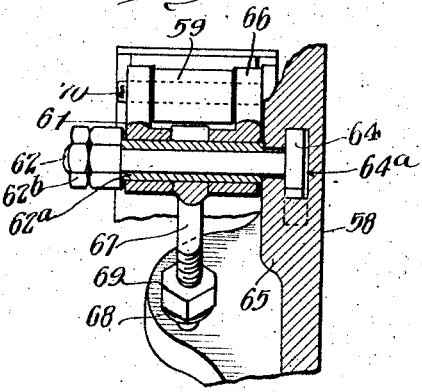
Inventor
Edward Timbs
By Lyon+Lyon
Attorneys Patented Apr. 24, 1928.

1,667,175

UNITED STATES PATENT OFFICE.

EDWARD TIMBS, OF LOS ANGELES, CALIFORNIA, ASSIGNOR TO UNION TOOL COMPANY, OF TORRANCE, CALIFORNIA, A CORPORATION OF CALIFORNIA.

CLUTCH FOR THREE-SPEED DRAW WORKS.

Original application filed April 21, 1924, Serial No. 707,937. Divided and this application filed September 14, 1925. Serial No. 56,257.

This invention relates to a clutch for a three-speed friction drawworks and the application is a division of my application, Serial No. 707,937, entitled Three-speed friction drawworks, filed April 21, 1924.

The present invention relates to the construction of a clutch which is constructed within the flange at the end of the drum of the drawworks.

The general object of this invention is to provide a clutch of simple construction especially adapted for use in connection with such a drum. The clutch includes an expansion ring which may be expanded out against the inner face of the drum flange. One of the objects of the invention is to provide simple means for supporting the expansion ring so that it can be readily adjusted to insure that the proper mechanical contact will take place between the expansion ring and the flange when the clutch is closed, thereby insuring that even when the wearing strip of the expansion ring is considerably worn, the clutch can always be tightly closed.

Further objects of the invention will appear hereinafter.

The invention consists in the novel parts and combination of parts to be described hereinafter, all of which contribute to produce an efficient clutch for three-speed drawworks.

A preferred embodiment of the invention is described in the following specification, while the broad scope of the invention is pointed out in the appended claims.

In the drawings:

Figure 1 is a side elevation and partial section, with parts broken away, illustrating a drawworks embodying my invention.

Figure 2 is an end elevation of the drawworks shown in Figure 1, certain parts being broken away and shown in section.

Figure 3 is a section taken on the line 3—3 of Figure 2 and further illustrating details of the friction clutch.

The drawworks includes a frame 1, of any suitable construction, and including three posts 2, 3 and 4, which may constitute part of the derrick frame. On the posts 2, 3 and 4 there is supported a rotatable drum-shaft 5 in suitable bearings 6.

I provide a counter-shaft 7 which is capable of driving the drum-shaft at a plurality of different speeds, but I do not connect the counter-shaft directly to the drum-shaft. In this way I avoid the necessity for three different driving connections to the drum-shaft, and this enables the drawworks to embody three different speed drives without substantially increasing the length of the drum-shaft.

The counter-shaft 7 is rotatably supported on the frame in suitable bearings 8 and may be provided at its ends with the usual catheads 9. This shaft is driven by suitable means such as a sprocket chain 10 from the engine, running over a sprocket wheel 11. At one end of the drawworks, and preferably between the intermediate post 3 and the end post 4, I provide a sprocket wheel 12 for driving a rotary drill table, and which is loose on the counter-shaft; its hub is formed into a clutch member 13, to cooperate with a clutch collar 14 splined on the shaft, and the clutch which is formed of the two clutch members 13 and 14 may be closed at will by means of a lever 15. Of course, when this clutch is open, the shaft 7 rotates without driving the sprocket wheel 12.

I provide a plurality of driving connections from the counter-shaft to a line-shaft 16, which line-shaft, like the shaft 7, is parallel with the drum-shaft 5. The line-shaft 16, however, is located at the back of the drawworks and preferably below the level of the other two shafts. In the present instance, I provide a three-speed drive for driving the line-shaft from the counter-shaft. These drives preferably involve the use of sprocket chains.

I provide means for driving the drum-shaft 5 from the line-shaft 16, and this means is preferably in the form of a single driving connection embodying the use of a sprocket chain 43 passing over a sprocket wheel 44 on the line-shaft and a sprocket wheel 45 on the drum-shaft.

On the drum-shaft 5 is mounted a drum 47, provided with two heads 48 and 49 which have flanges 50 to receive brake bands 51, said brake bands being connected with a crank-shaft 52 which may be operated at will by a lever 53. This crank-shaft 52 is attached to the free ends of the brake bands and enables the lever 53 to tighten the bands at will. The other ends of the bands are attached to anchor bolts 54 secured through the floor 55 of the derrick.

The flange 50 of the drum-head 48 projects away from the disc of the head so that the effect is that the head 48 is open on its outer side. I utilize this space in the open head of the drum to house a friction clutch. In this way the friction clutch may be attached to the shaft without necessitating any increase in the length of the drum-shaft 5. The clutch is preferably of the expansion type, that is to say, it involves the use of a shoe which is expanded outwardly against a flange on the drum-head. For this purpose, I could utilize the regular flange 50 of the drum-head, but this would make the friction clutch larger than necessary, and hence I prefer to provide a special flange 56. Within the space surrounded by this clutch flange 56 I provide a clutch member having a hub 57 and a disc 58, and on this disc I attach a friction shoe device referably in the form of an expansion ring 59 (see Fig. 2). One end only of this expansion ring is anchored to the disc 58 by a suitable fixed bolt 60, and it extends uninterruptedly throughout substantially the entire circumference of the flange 56. The other end of the expansion ring 59 is movably mounted, and I provide means for expanding the expansion ring so that it exerts its expansive force outwardly in all directions against the inner face of the flange 56 at will. Any suitable means may be employed for this purpose, but I prefer to provide a rocker in the form of a bell-crank lever 61 which is mounted to rock on a rocking-pin 62 (see Figure 3). This rocking-pin has a head 64 which is adjustably mounted in a T-slot 64ᵃ of arcuate shape formed in a boss 65 on the face of the disc. This bolt or pin projects out horizontally from the face of the disc and carries a clevis 66 which is attached to the live end of the expansion ring 59. The end of the expansion ring 59 is mounted within the yoke extension 66 of the bell crank 61 on the pin 70. The construction at this point should be such as to enable the pin 62 to be adjusted along the slot and secured in any adjusted position desired. A distance-sleeve 62ᵃ is provided, which co-operates with nuts 62ᵇ to clamp the bolt 62 securely in place.

As the strain upon this pin 62 is very great, I provide means for bracing it in position, in addition to means for clamping it in the slot. For this purpose, I provide a bracing bolt 67, the outer end of which is threaded and passes loosely through an elongated slot in a curved lug 68 on the face of the disc 58. A clamping nut 69 is provided on each side of this lug so that the bracing bolt 67 can be clamped in any desired position in the slot. This enables the bolt to be shifted in a lateral direction when its outer end, that is to say, its head end which engages the pin 62, is shifted along the slot with the bolt 62. The expansion ring 59 is provided with a wear-strip or lining 59ᵃ. As this wear-strip becomes worn, the expansion ring can be adjusted out by moving the pin 62 further out in the slot 64ᵃ.

The long arm of the bell-crank lever is attached by a loose pin 71 to a swivel knuckle 72, the said swivel-knuckle 72 being connected by a loose pin 73 with a strut link 74 (see Figure 1). The inner end of this strut link 74 is pivotally attached to a sliding collar 75 on the drum-shaft, and when this sliding collar 75 is shoved to the right, as viewed in Figure 1, it will produce an outward thrust in the strut link 74 and this will rock the bell-crank lever 61 in a direction to expand the expansion ring 59 and press it forcibly against the inner face of the flange 56.

The collar 75 is controlled at will by means of a clutch lever 76 (see Figure 1), the middle portion of which is formed into a yoke 77 connected by the usual pins with the collar 75, and the inner end of this lever is pivotally supported on a fixed bracket 78 on post 2. (See dotted lines in Figure 2.)

Each head of the drum is provided with a roller bearing 82 which enables the drum to rotate freely on the drum-shaft when the friction clutch composed of the expansion ring 59 and the flange 56 is open. The rotation of the drum without rotating the drum-shaft is advantageous because it tends to prevent vibration when the drum is rotating at the very high speeds which occur in letting tubing run down into the well at a high speed.

It is to be understood that the embodiment of the invention described herein is only one of the many embodiments this invention may take, and I do not wish to be limited in the practice of the invention, nor in the claims, to the particular embodiment set forth.

What I claim is:

1. In a rotary drawworks, the combination of a frame, a drum-shaft mounted on the frame, means for driving the drum-shaft, a drum loose on the drum-shaft and having a head with a projecting flange, a friction clutch member with a disc rigidly secured to the drum-shaft and having a shoe in the form of a single expansion ring to engage the inner side of the flange, said ring being fixed at one end only on the disc and extending uninterruptedly along substantially the entire circumference of the flange to constitute a friction clutch, a rocker pin mounted on the disc, a rocker on the pin attached to the other end of the expansion ring, means for adjustably guiding the rocker pin on the disc to regulate the pressure of the ring on the flange, and means for actuating the rocker to move the expansion ring to close the clutch.

2. In a rotary drawworks, the combination of a frame, a drum-shaft mounted on the frame, means for driving the drum-shaft, a drum loose on the drum-shaft and having a head with a projecting flange, a friction clutch member having a hub rigidly secured to the drum-shaft and having a disc, an expansion ring fixed at one end only to the disc and extending uninterruptedly along substantially the entire circumference of the flange to constitute a friction clutch, said disc having a pin mounted thereupon, a rocker mounted to rock on the last named pin and connected with the expansion ring for expanding the same, means for adjusting the pivot pin to regulate the clearance of the expansion ring with respect to the said flange, and a controlling lever for the clutch connected with the rocker to actuate the same.

3. In a rotary drawworks, the combination of a frame, a drum-shaft mounted thereon, means for driving the drum-shaft, a drum loose on the drum-shaft and having a head with a projecting flange, a clutch member having a hub rigidly secured to the drum-shaft and having a disc with an adjusting slot extending in a general circumferential direction, a rocker-pin adjustably mounted in the slot, an expansion ring fixed at one end to the disc, a rocker mounted on the rocker pin and connected with the expansion ring to expand the same, a strut link with a swivel knuckle connecting the same to the rocker, and a clutch lever for actuating the strut-link to expand the ring and close the friction clutch.

4. In a rotary drawworks, the combination of a frame, a drum-shaft mounted thereon, means for driving the drum-shaft, a drum loose on the drum-shaft and having a head with a projecting flange, a clutch member having a hub rigidly secured on the drum-shaft and having a disc with an adjusting slot, a rocker-pin adjustably mounted in the slot, an expansion ring supported on the disc, a rocker mounted on the rocker pin and connected with the expansion ring to expand the same, a clutch lever for actuating the rocker to expand the ring and close the friction clutch, and a bracing bolt secured to the disc and connected with the rocker-pin to brace the same.

5. In a rotary drawworks, the combination of a frame, a drum-shaft mounted thereon, means for driving the drum-shaft, a drum provided with a projecting flange loose on the drum-shaft, a friction clutch member rigidly secured to the drum-shaft and having a disc, an expansion ring supported by the disc to co-operate with the flange to constitute a friction clutch, a rocker-pin, an arcuate slot on the disc, means for securing the rocker-pin adjustably in the slot, a rocker on the rocker-pin connected with the expansion ring for expanding the same against the flange, and a clutch lever with means for actuating the rocker to expand the expansion ring against the flange to close the friction clutch.

Signed at Torrance, Calif., this 2nd day of Sept., 1925.

EDWARD TIMBS.